Dec. 30, 1947.    D. W. SHERMAN    2,433,631
WELD FABRICATED YOKE
Filed Jan. 27, 1944
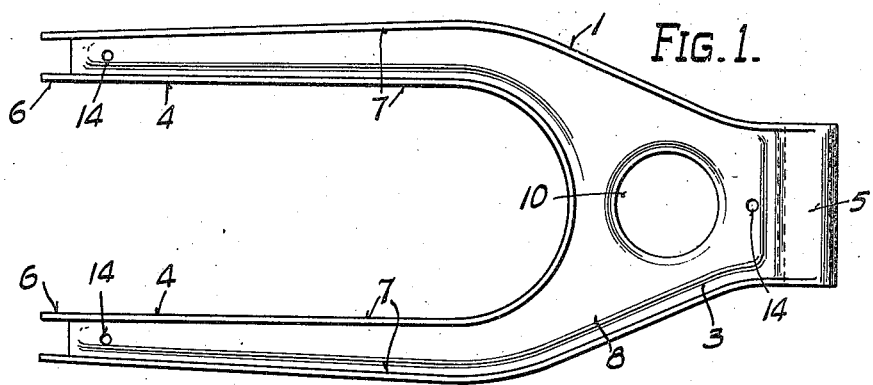
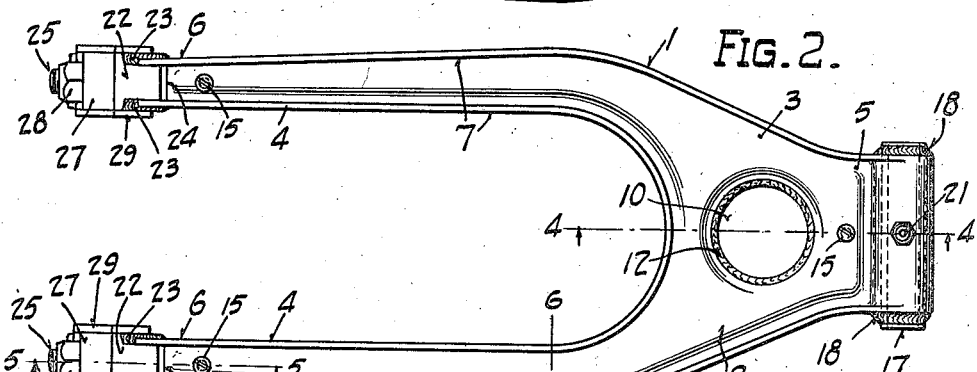
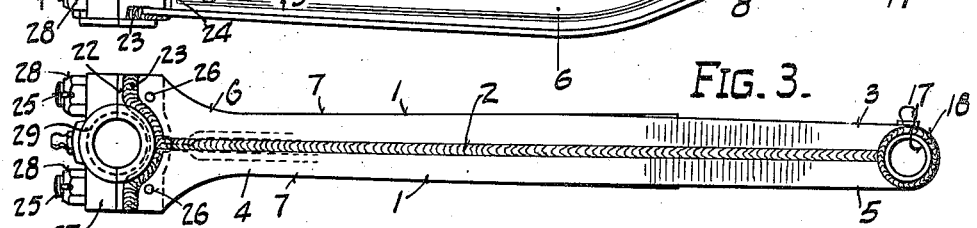
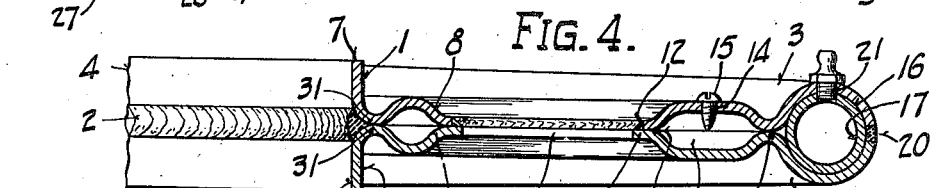
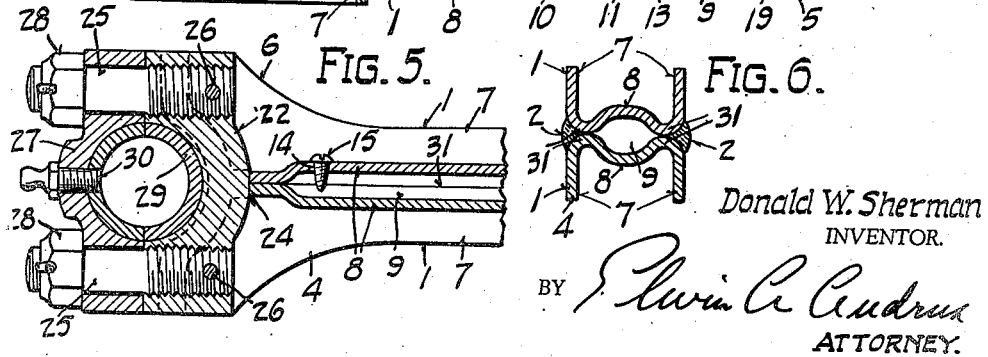
Donald W. Sherman
INVENTOR.
BY
ATTORNEY.

Patented Dec. 30, 1947

2,433,631

UNITED STATES PATENT OFFICE 2,433,631

WELD FABRICATED YOKE

Donald W. Sherman, Shorewood, Wis., assignor to A. O. Smith Corporation, Milwaukee, Wis., a corporation of New York Application January 27, 1944, Serial No. 519,942

11 Claims. (Cl. 244—100)

This invention relates to a weld fabricated yoke that may be employed as a shock absorber mounting for airplanes.

The invention proposes to replace the forged yokes that were previously employed by a welded shock absorber mounting structure pressed from suitable gauge metal of uniform thickness.

The principal object of the invention is to provide a shock absorber yoke that can be more economically produced than previously fabricated yokes.

Another object of the invention is to provide a shock absorber yoke of lighter weight and greater rigidity.

These and other objects of the invention will be clear from the following description and the accompanying drawing illustrating an embodiment of the invention.

In the drawing:

Figure 1 is a top plan view of the shock absorber yoke in blank form;

Fig. 2 is a top plan view of the final assembled yoke;

Fig. 3 is a side elevational view of the completed yoke;

Fig. 4 is a section taken longitudinally of the body of the yoke on line 4—4 of Fig. 2;

Fig. 5 is a section taken on the line 5—5 of Fig. 2; and

Fig. 6 is a section taken across the yoke arm on line 6—6 of Fig. 2.

Referring to the drawing, there is illustrated two flanged U-shaped members 1 disposed back to back and welded together along their longitudinal meeting lines by a weld 2 to form a shock absorber yoke comprising generally a body portion 3 of tapered cross section and substantially straight arm members 4 projecting in parallel relation from the body portion.

The body portion end 5 is suitably fabricated for pivoting to a frame, not shown, of an airplane, and the arm terminal ends 6 are disposed for pivoting to a shock absorber cylinder not shown. The weld 2 extends on the outside of the yoke from each arm end 6 to body end 5 and similarly around the inside of the yoke from end to end.

The channeled yoke structure between the ends 5 and 6 comprises the upturned and downturned flanges 7 and the complementary webs 8 disposed therebetween. The upturned and downturned flanges extend in opposed directions, respectively, on each side of the weld joint 2 from the terminal ends 6 of each arm 4 to the body portion end 5 on the outside of the yoke and in similar relation around the inside of the yoke.

The oppositely disposed complementary webs 8 start in arms 4 at a line slightly removed from each arm end 6 and continue to the body end 5 of the yoke. In their extent from end to end of the yoke, the webs widen from relatively narrow width in cross section in arms 4 to substantially greater width in cross section in body portion 3. This provides the body of the yoke with a considerable cross sectional area as compared to the area in the arm members.

The webs 8 are curved outwardly in the same direction in which their respective flanges 7 extend. The curved channel web structure provides the tubular opening 9 between the webs 8. This opening extends throughout the yoke from arm ends 6 to body end 5 and serves to give increased rigidity to the entire structure and to provide for the coating of the interior backs of the members with a liquid corrosion preventing substance such as linseed oil.

An aperture 10 extends vertically through the members 1 in the body 3 of the yoke to lighten and give greater rigidity to the yoke structure.

The diameter of the aperture 10 in the lower web 8 is less than that in the upper web 8 to provide a ledge 11 for receiving a fillet weld 12 disposed around the edge of the aperture to secure the webs together. The webs 8 are also curved, as described, adjacent the aperture and are disposed in engagement with each other at the circumferential line 13 around the aperture 10 to provide for the reception of the fillet weld 12 and give to the body 3 the tubular opening 9 previously described.

One of the members 1 of the yoke is provided with holes 14 preferably adjacent arm ends 6 and body end 5 to permit heated gases to escape during welding, and to provide for the introduction of oil to coat the parts and protect the same from corrosion. These holes 14 are later closed with the drive screws 15.

The body end 5 has a substantially horizontal opening 16 therethrough for receiving a cylindrical bushing lining 17 which is arc welded in place by the circumferential fillet welds 18 at each end of opening 16 between the lining and the respective webs 8 of the yoke portion encircling the lining.

The webs 8 are depressed into engagement at the line 19 adjacent body end 5 and then turn outwardly to form the opening 16 for receiving the bushing lining 17. The end edges of webs 8 form a welding groove at one side of the lining 17 and weld metal 20 secures the same together and to the lining.

An opening 21 may be vertically disposed in one of the webs 8 at the body end 5 to provide for lubrication of the bushing member.

The arm ends 6 of the yoke are each fabricated in the same manner to prepare the same for receiving the trunnion bearing of an air cylinder, not shown. The description of one yoke arm terminal 6 may well be applied to both terminals.

As previously described, the upturned and down-turned flanges 7 at arm end 6 of the yoke extend beyond the webs 8 a slight distance to provide for receiving a bushing anchor between the flanges.

The bushing anchor generally comprises a semi-cylindrical forging 22 welded to the flanges 7 by the arc welds 23. The forging has a slight outward curvature at its outer central portion and this portion abuts against the ends of webs 8 at 24.

The studs 25 are threaded into the forging 22 at the upper and lower portions respectively and are held in place by rivets 26. Each rivet extends through the arm end 6 and the forging and through the respective stud which the rivet secures.

A complementary semi-cylindrical cap 27 slips over the outer end of the studs and is held in place by nuts 28 threaded onto the outer end of each stud 25. The cap 27 and forging 22 encircle the split spool bushing 29, and the flanges of the spool bushing extend on either side of the bushing anchor to reinforce the same. A lubricator opening 30 may be provided in cap 27 to facilitate lubrication of the bushing 29 which receives the trunnion of the shock absorber air cylinder of an airplane.

In fabricating and assembling the yoke two substantially complementary channeled yoke shape members 1 are first pressed from sheet metal of uniform thickness. In the forming operation the web 8 of each member is curved outwardly in the direction of the flanges 7 of the respective member 1 to provide the shoulders 31 adjacent flanges 7 and extending coextensively therewith.

The body portion of each member 1 is also provided with an aperture 10 which is disposed in the depressed central portion of the body. The body ends 5 of the members are turned outwardly to form the end into a semi-cylindrical shape to encircle lining 17.

One of the channel-shaped members 1 may be provided with the gas escape holes 14 at suitable locations and lubricator opening 21 at the body end 5. One of the channeled members 1 is also formed so that the web 8 in the body portion thereof will extend into aperture 10 a greater distance than the web of the other member assembled with it, in order to provide the welding ledge 11 circumferentially around aperture 10.

The pressed channel-shaped metal members 1 are next assembled back to back in suitable welding jigs and then welded along their longitudinally extending meeting edges at 2 on the outside and around the inside of the yoke.

In assembling the members 1 for welding, their respective flanges 7 are disposed in opposite directions and the shoulders 31 adjacent the flanges of one member are assembled in tight engagement with the complementary shoulders of the other member to form a welding groove around the inside and on the outside of the yoke at the meeting line into which weld metal 2 is deposited by electric arc welding to join the channel members together.

Fig. 6 is a section taken across the arm 4 of the yoke illustrated in the drawing and shows the I-beam that is formed of the arms when the channel members 1 are assembled and welded together in the manner described.

The curved web portion forming the central part of the I-beam arm provides extra thickness through the neutral axis of the arms without substantial additional weight of metal in the web and gives greater rigidity, particularly in the horizontal plane of the neutral axis of the arm members.

The bushing lining 17 may next be inserted in the horizontally disposed opening 16 at the body end 5 of the yoke and then is welded in place by the fillet welds 18 and the end weld 20. The welds 18 and 20 are preferably made by electric arc welding.

The webs 8 are also joined together at aperture 10 by the fillet weld 12 which is formed by depositing weld metal by electric arc welding on the ledge 11.

Fig. 4 is a section taken longitudinally of the body 3 of the yoke to illustrate the curved structure of the body web and shows the manner of welding the webs 8 together around the aperture 10.

The drive screws 15 may be inserted in holes 14 after sufficient time has elapsed to permit the welds to cool, and after oil or paint has been injected to protect the inner surface from corrosion.

The yoke is completed by assembly of the bushing anchor with the yoke arm terminals 6. The semi-cylindrical yoke forging 22 and complementary cap 27 are fabricated preparatory to assembly with the yoke. Forging 22 is first welded to flanges 7 of terminal end 6 preferably by the electric arc welds 23, and then the cap 27 is secured thereon by studs 25 and nuts 28 with a spool bushing 29 disposed therebetween. Rivets 26 may be inserted through the yoke terminal and forging to hold the studs in place.

The invention provides a pressed metal yoke of light weight and substantial rigidity that can be more economically produced than previous yokes and which is fabricated to give better service when in use.

Various embodiments of the invention may be employed within the scope of the accompanying claims.

I claim:

1. A pressed steel shock absorber support comprising a tubular yoke formed from two complementary yoke-shaped members having channels therein and with their backs engaging each other along longitudinal meeting lines and the channels open outwardly; and a weld joining said members along the meeting lines thereof.

2. A pressed steel shock absorber yoke for airplanes comprising a tubular yoke formed by two outwardly flanged and outwardly cupped members having their backs engaging each other and a weld joining said members together along an outer marginal meeting line in the central plane of the yoke.

3. A pressed steel shock absorber for airplanes comprising a yoke formed by two complementary members having their backs engaging each other along longitudinally extending meeting lines in the central plane of the yoke, a weld joining said members together along said meeting lines, the said members having flanges disposed in opposed relation to provide the inside and outside edges thereof to reinforce the same, and web portions disposed between said flanges, the web of each member being outwardly bent and disposed in opposed relation to provide the shock absorber yoke as a tubular structure of substantial rigidity.

4. A pressed steel shock absorber yoke for airplanes comprising a channeled yoke member fabricated from two channeled halves having their backs engaging each other along longitudinal meeting lines in the central plane of the yoke, a weld joining said members together along said meeting lines, and a cylindrical opening disposed at the body end of the yoke and extending transversely thereacross with its axis in the central plane of the yoke to provide the same for pivoting to the frame of an airplane.

5. A pressed steel shock absorber yoke for airplanes comprising a flanged and webbed member fabricated from two complementary channel halves having their backs engaging each other along longitudinal meeting lines in the central plane of the yoke and with the flanges thereof extending beyond the web portions in the arm portions of the yoke, a weld joining said members together along said meeting lines, and bushing anchors assembled and welded to said flanges at the respective arm ends to provide for pivoting of the yoke to a shock absorber cylinder.

6. A pressed steel shock absorber yoke for airplanes comprising a flanged and webbed member fabricated from two complementary channel halves having their backs engaging each other along longitudinal meeting lines in the central plane of the yoke, and with the flanges thereof extending longitudinally beyond the web portions in the arms of the yoke, a weld joining said members together along said meeting lines, bushing anchors assembled and welded to said flanges at the respective arm ends to provide for pivoting of the yoke to a shock absorber cylinder, and a cylindrical opening disposed at the body end of the yoke and extending transversely thereacross with its axis in the central plane of the yoke to provide the same for pivoting to the frame of an airplane.

7. A pressed steel shock absorber yoke comprising two complementary flanged members having their backs engaging each other along longitudinal meeting lines with a weld joining the members together along said longitudinal meeting lines to provide the yoke with a body portion and arm members projecting therefrom, the web portions lying between the flanges of each member being outwardly cupped to provide the yoke with a tubular shape from end to end, and the said flanges and webs providing the arm members with an I-beam cross section of substantial moment about the neutral axis thereof in both vertical and horizontal directions.

8. A pressed steel shock absorber yoke comprising two complementary flanged members disposed back to back in the plane of the yoke, the web portions lying between the flanges of each member being outwardly turned in opposed relation to provide the yoke with a tubular shape from end to end, and the shoulders disposed in the webs meeting at outer marginal lines in the central plane of the yoke to provide a welding groove extending longitudinally at the edges of the yoke, and arc deposited weld metal disposed in said grooves to weld the members together.

9. A pressed steel shock absorber yoke comprising two complementary flanged members disposed back to back in the plane of the yoke, the web portions lying between the flanges of each member being outwardly turned in opposed relation to provide the yoke with a tubular shape from end to end, and the shoulders disposed in the webs meeting at outer marginal lines in the central plane of the yoke to provide a welding groove extending longitudinally at the edges of the yoke, and arc deposited weld metal disposed in said grooves to weld the members together, said webs being apertured in the body portion of the yoke with the aperture edges thereof formed inwardly and welded together.

10. A pressed steel shock absorber yoke comprising two complementary flanged members disposed back to back in the plane of the yoke, the web portions lying between the flanges of each member being outwardly turned in opposed relation to provide the yoke with a tubular shape from end to end, and the shoulders disposed in the webs meeting at outer marginal lines in the central plane of the yoke to provide a welding groove extending longitudinally at the edges of the yoke, and arc deposited weld metal disposed in said groove to weld the members together, at least one of said webs having a plugged hole therein for the escape of air during welding to provide for the introduction of a corrosion resistant fluid coating the inside of the yoke for protection against corrosion.

11. A pressed steel shock absorber yoke comprising two channeled yoke-shaped members having their backs engaging each other along marginal meeting lines with a weld joining the members together along said lines and having a tubular section extending from end to end thereof, a cylindrical sleeve provided at one end of said yoke formed by the meeting end portions of the channeled members and extending transversely across the yoke with the axis thereof in the central plane of the yoke, a bushing sleeve disposed in said cylindrical sleeve, circumferential fillet welds provided at each end of the sleeve to weld the same to the ends of the bushing, and an arc weld joining the said members together at the meeting line of their end edges to secure the bushing therebetween.

DONALD W. SHERMAN.

REFERENCES CITED

The following references are of record in the file of this patent:

UNITED STATES PATENTS

| Number | Name | Date |
|---|---|---|
| 2,299,935 | Slack et al. | Oct. 27, 1942 |
| 1,418,087 | Layman | May 30, 1922 |
| 2,057,897 | Jencick | Oct. 20, 1936 |
| 2,218,127 | Urschel | Oct. 15, 1940 |
| 1,262,786 | Harley | Apr. 16, 1918 |
| 619,550 | Fauber | Feb. 14, 1899 |
| 2,089,889 | Giordani | Aug. 10, 1929 |

FOREIGN PATENTS

| Number | Country | Date |
|---|---|---|
| 665,331 | France | May 6, 1929 |
| 526,352 | Great Britain | Sept. 17, 1940 |
| 663,940 | France | Apr. 16, 1929 |